J. C. DONNELLY.
MACHINE FOR ASSEMBLING MATCH BOOKS, &c.
APPLICATION FILED MAY 16, 1913.
1,132,310.
Patented Mar. 16, 1915.
5 SHEETS—SHEET 2.
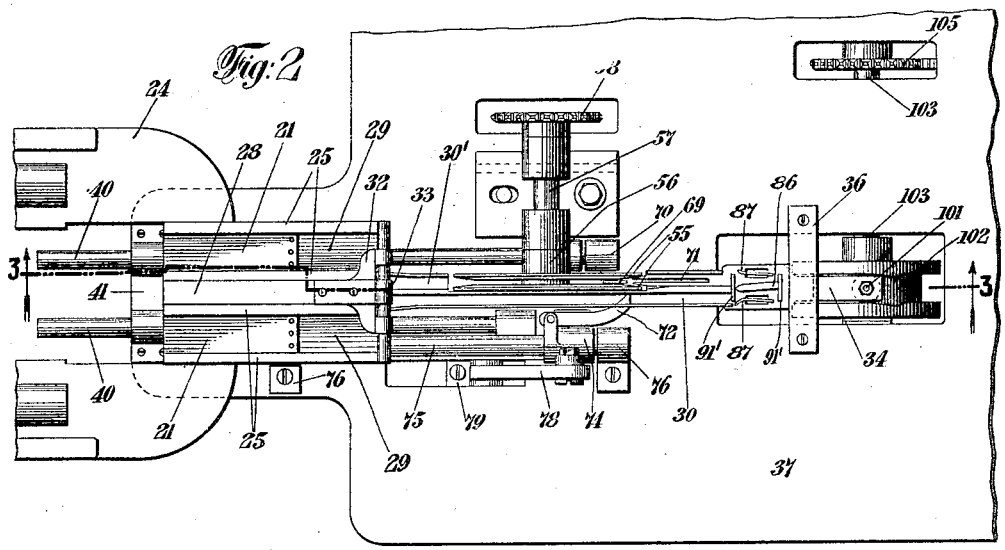
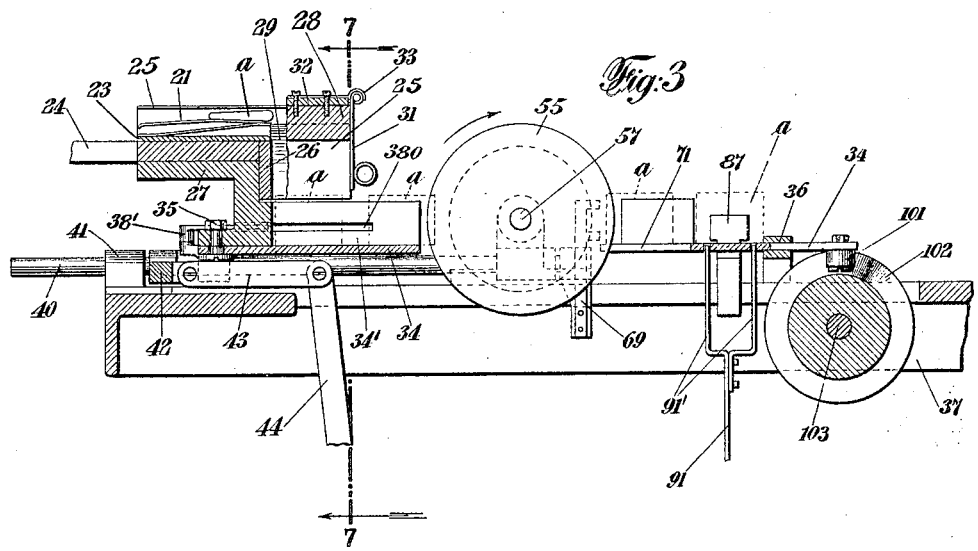
Witnesses:
W. B. Goewey.
F. R. Griffin.
Inventor
Joseph C. Donnelly
By his Attorney
John R. Nolan

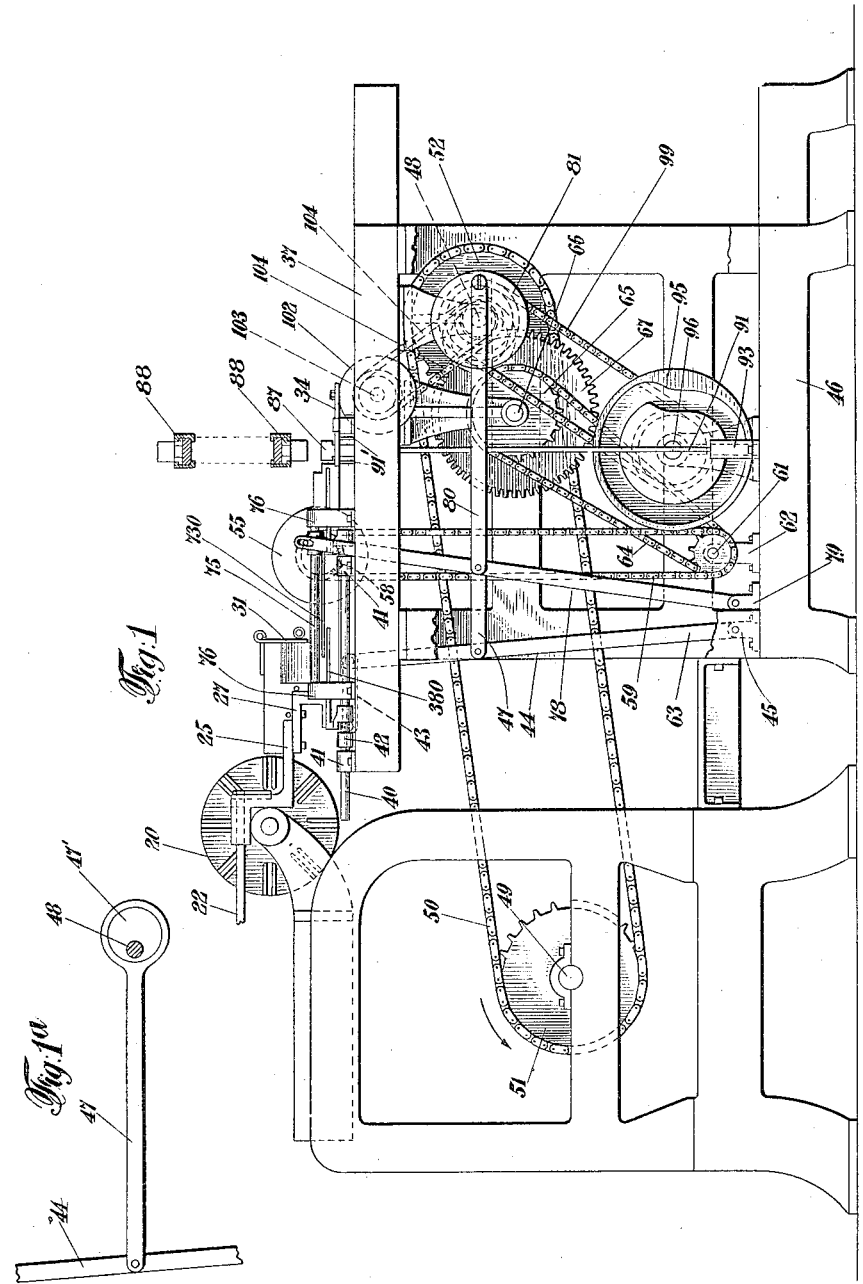

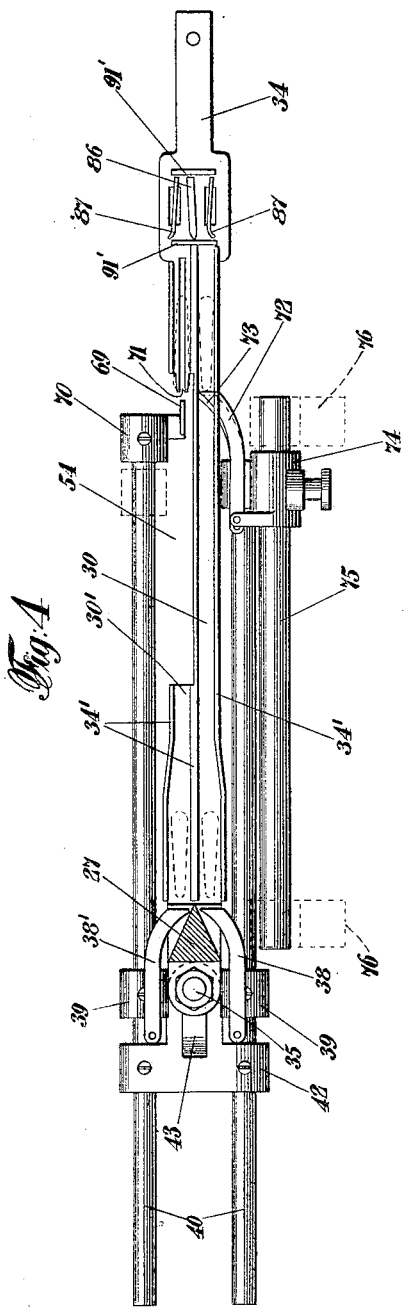

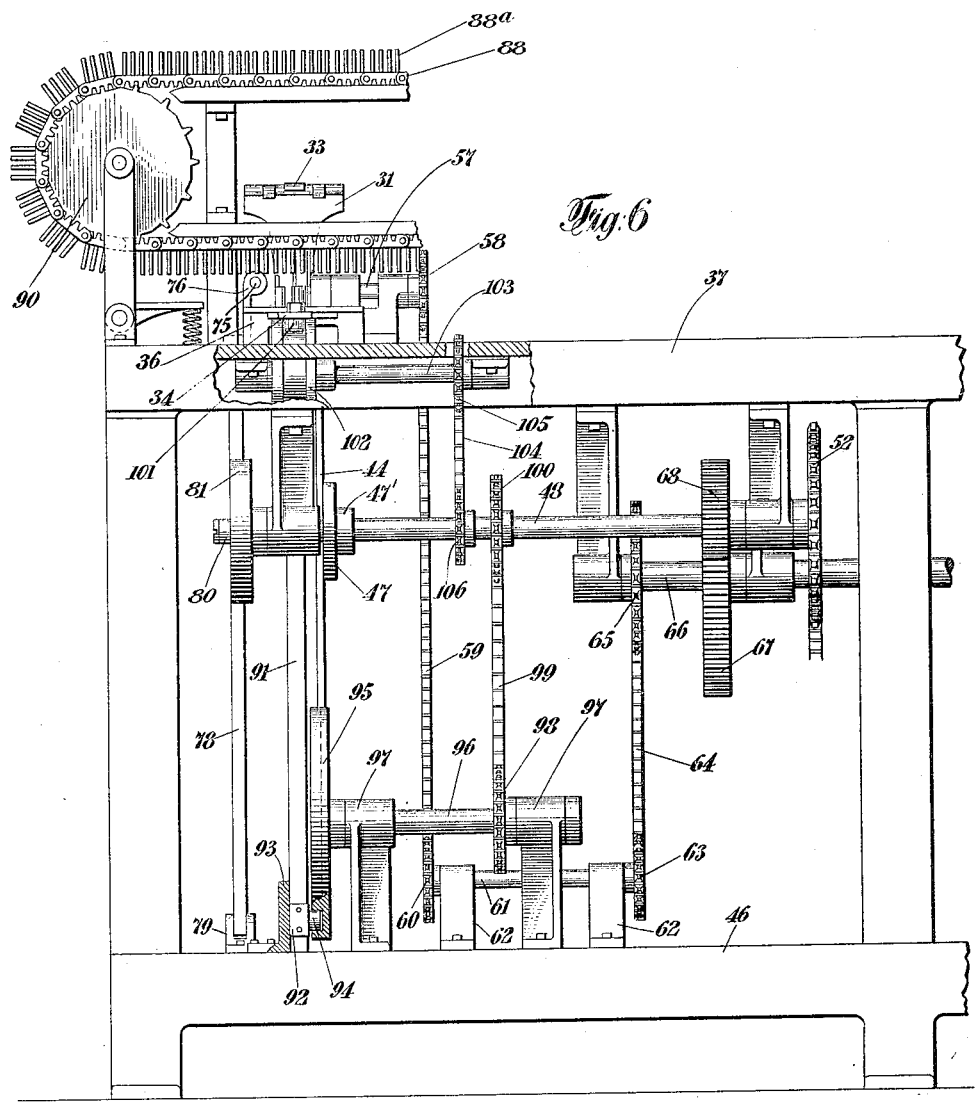

J. C. DONNELLY.
MACHINE FOR ASSEMBLING MATCH BOOKS, &c.
APPLICATION FILED MAY 16, 1913.
1,132,310.
Patented Mar. 16, 1915.
5 SHEETS—SHEET 5.
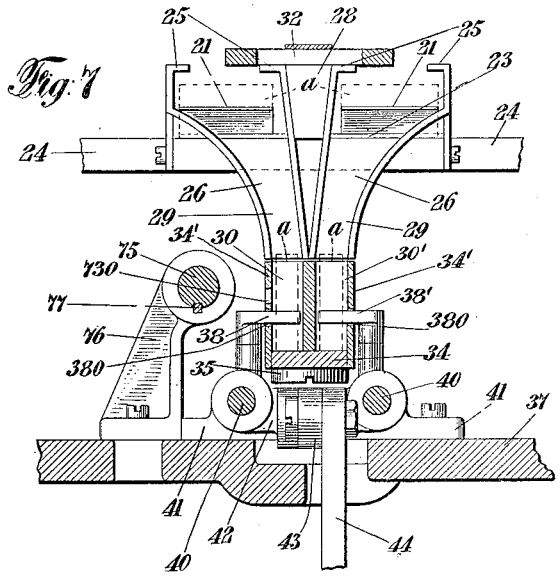
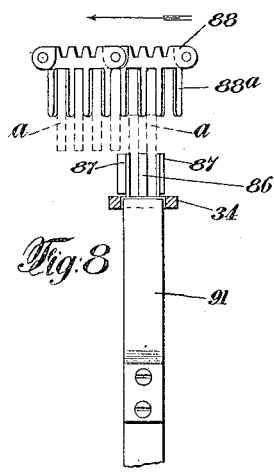
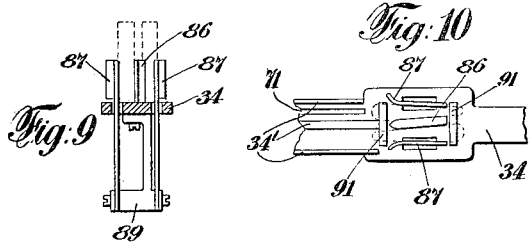
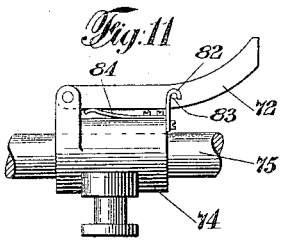
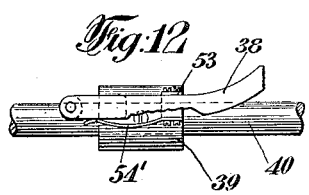
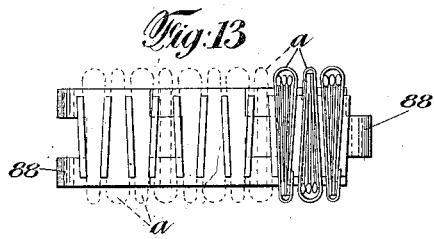
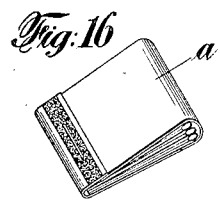
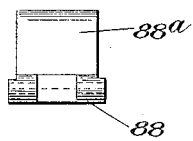
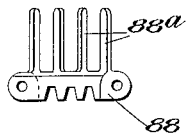
Witnesses:
W. B. Lowrey
F. C. Griffin
Inventor
Joseph C. Donnelly
By his Attorney
John R. Nolan
THE NORRIS PETERS CO., PHOTO-LITHO., WASHINGTON, D. C.

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

MACHINE FOR ASSEMBLING MATCH-BOOKS, &c.

1,132,310.

Specification of Letters Patent.  Patented Mar. 16, 1915.

Application filed May 16, 1913. Serial No. 767,982.

*To all whom it may concern:*

Be it known that I, JOSEPH C. DONNELLY, a citizen of the United States, and resident of Barberton, in the county of Summit and State of Ohio, have invented certain new and useful Improvements in Machines for Assembling Match-Books, &c., of which the following is a specification.

In my application for Letters Patent of the United States Serial No. 762,872, filed April 22, 1913, is shown and described a machine for packing match-books and the like, the same being therein represented as associated with a match-book making machine of the character illustrated in Letters Patent of the United States No. 1,042,472, and being adapted to receive the books as rapidly as they are produced and, through the instrumentality of assembling mechanisms, to arrange them uniformly and compactly side by side with the adjacent books oppositely disposed relatively to the heads of the matches.

The subject of the present application may be described as a modification of the assembling mechanism set out in my previous application above referred to, and, accordingly, the present invention comprises various novel features of construction and organization which will be hereinafter described and claimed.

In the drawings—Figure 1 is an end elevation, partly in section, and with part of the frame-work broken away, of a portion of a match-book packing machine embodying my invention, the same being represented as associated with a book-match machine. Fig. 1ᵃ is a detail, in elevation, of the eccentric connection, and adjuncts, for actuating the lever for reciprocating the upper supplemental feed-dog (72). Fig. 2 is a plan, enlarged, of the mechanism for receiving, feeding and positioning the books preparatory to their introduction to the carrier. Fig. 3 is a longitudinal vertical section thereof, as on the line 3—3 of Fig. 2. Fig. 4 is a detail, in sectional plan, of the book-feeding dog devices, and adjuncts, the book positioning or reversing wheel and other parts being omitted. In this view the dogs are shown in the relative positions which they occupy at the instant the books are brought side by side in opposite relation to each other. Fig. 5 is a similar view, with the upper supplemental dog removed, showing the relative positions of the remaining dogs at the instant the oppositely-disposed books are inserted in the partitioned supporting member, preparatory to transference to the carrier. Fig. 6 is a side elevation, partly in section, of the book-receiving end of the packing machine. Fig. 7 is a transverse vertical section, as on the line 7—7 of Fig. 3, showing, among other things, the guide-ways for deflecting the books in pairs from a horizontal to a vertical position. Fig. 8 is a sectional detail, showing a portion of the carrier, the book-supporting member below the same, and the plunger for transferring the books from the supporting member to the carrier. Fig. 9 is a detail showing the said book-supporting member. Fig. 10 is a plan of Fig. 9. Figs. 11 and 12 are details, in plan, of dogs for feeding the books along the trackways. Fig. 13 is a plan of several links of the carrier chain, showing the orderly disposition of the books therein. Fig. 14 is a side elevation of one of the links. Fig. 15 is an end view of the same. Fig. 16 is a perspective view of a match-book.

The invention is herein illustrated as adapted to a machine for the packing of match-books and analogous articles, the source of article supply comprising preferably, though not essentially, the machine of Patent No. 1,042,472 above referred to.

Referring to the drawings, 20 (Fig. 1) designates the intermittently-rotatable wheel of the book-match machine, from which the finished match books (*a*) are discharged in pairs, headed ends rearward, upon yielding supporting plates 21 by the action of the reciprocating ejecting frame 22; each pair of books, abreast, being thence pushed rearwardly by the next succeeding pair, and so on. In the present instance the supporting plates are secured to a horizontal plate 23 affixed to the rearwardly-extending bracket 24 of the book-machine. Parallel angle-bars 25 are arranged in spaced relation to each other to afford relatively-broad guide-ways for the match-books which are deposited on the spring plates. The outer bars are secured to the bracket 24 and also to a plate 26 which is connected to the ends of the bracket 24 and to a bracket 27 on the underside of the bracket 24; the inner guide bars being secured to an intermediate bar 28 on the top of the bracket 24. (See Figs. 2, 3 and 7).

The bars 25 extend rearwardly of the spring-plates, and are shaped to afford two downwardly-extending converging guideways 29 into which the books are delivered from the spring plates, and such books, being unsupported at their bottoms, are thereby deflected from a horizontal position, edgewise of each other, to a vertical or upright position laterally adjacent each other. The outer plates are curved inwardly, and the inner plates converge, as indicated in Fig. 7, toward two relatively-narrow trackways 30, 30', into which the books, in upright position, side by side, are delivered by the guide-ways 29. The outer, or rearward, portions of these guide-ways, are closed by a plate 31 which is preferably hinged to a bracket 32 on the bar 28 in order that access can be readily had to the guide-ways as need may require. The hinged plate is held normally in closing position by means of a suitably-disposed spring 33. (Figs. 2 and 3). The trackways are formed upon a horizontally-disposed rearwardly extending bar 34, the forward end of which is pivoted, as by a stud 35, (Fig. 3) to the bracket 27 and its rearward or free end is slidingly supported in a horizontal guide-bracket 36 on the table 37 of the packing machine, for a purpose presently explained. In the present instance the bar 34 is provided with spaced longitudinal plates 34' which constitute the side walls of the trackways, the upper surface of the bar affording a floor therefor. (See Figs. 4, 5 and 7.) These trackways extend rearwardly to the assembling station, and means, including a book positioning or reversing device, are provided whereby the books are impelled along the trackways and the successive books of one of the trackways (in the present instance 30') endwise reversed during their travel in order that the laterally adjacent books as they reach or approach the said station shall be oppositely-disposed relatively to the heads of the contained matches.

The books, when deposited side by side at the receiving end of the trackways, are advanced simultaneously along the latter by a pair of dogs 38, 38' which extend through longitudinal slots 380 in the outer walls of the respective trackways. (See Fig. 7.) These dogs are pivoted to collars 39 secured to reciprocating rods 40 mounted to slide in bearing brackets 41 on the table. The rods are coupled by a cross-piece 42 which is pivotally connected by means of a link 43 with a rock-lever 44 fulcrumed in a bracket 45 on the bed-plate 46 of the packing machine. The rock-lever is connected by means of a rod 47 with an eccentric 47' on the main shaft 48 of the packing machine, (Fig. 1ª) said shaft being preferably geared with the main shaft 49 of the book-making machine, as for example by the chain 50 operatively connecting sprocket wheels 51, 52 on the respective shafts. The rearward throw of the lever 44, by actuation of the eccentric, is sufficient to impel the dogs 38, 38' to a position adjacent the book-reversing device, one of the books thus being introduced to the latter while the companion book remains in its trackway.

On each of the collars 39 is preferably disposed a stop 53 against which the dog is actively held by a suitably-disposed spring 54' on the collar, which spring, yielding, permits the outward movement of the dog as it impinges against and passes a book in its return stroke. (See Fig. 12).

In the present instance this book-reversing device embodies a wheel which is mounted to rotate in a gap 54 formed in the trackway 30'. The wheel comprises two spaced disks 55 on a central hub 56 fast on a shaft 57 which has its bearings in brackets on the table 37, the peripheral portions of the disks being preferably beveled or flared to facilitate the entrance of a match book therebetween and the disks being properly spaced to hold the books by lateral friction incident to the springy nature of the books. The shaft 57 is continuously rotated by suitable gearing, so that the book supplied to the wheel by the feed-dog 38' will be carried across the gap 54 and thus be endwise reversed and deposited upon the rearward part of the trackway. (See Fig. 3). In the form of gearing illustrated, the shaft 57 bears a sprocket wheel 58 which is connected by means of a chain 59 with a similar wheel 60 on a shaft 61 which has its bearings in brackets 62 on the bed-plate.

The shaft 61 bears a sprocket wheel 63 which is connected by means of a chain 64 with a similar wheel 65 on a shaft 66 adjacent the drive shaft 48, the shaft 66 also bearing a spur wheel 67 which meshes with a pinion 68 on the drive shaft. Any other appropriate form of gearing for rotating the positioning or reversing wheel may be used.

When the book has been deposited in reverse position upon the rearward part of the trackway 30' by the wheel such book is pushed from the wheel and along the trackway by means of a suitable pusher which extends into the space between the disk members of the wheel. The pusher herein illustrated comprises a vertically-disposed finger 69 which is secured to an arm or extension of a collar 70 on one of the reciprocating bars 40. The floor of the rearward part of the trackway 30' is slotted, as at 71, to permit sufficient rearward movement of the pusher to insure the entrance of the book into a supporting member at the assembling station, as will be presently described.

It is to be noted that the parts are so constructed and timed that in each rearward stroke of the dog 38' a match-book is entered in the wheel, and as the wheel rotates successive books are spaced therein at regular intervals and correspondingly transferred to and pushed along the rear part of the trackway.

In order that the books in the adjacent trackway 30 shall be impelled in a manner to insure the simultaneous feeding of companion books to the supporting member at the assembling station, supplemental feeding mechanism for the books in the trackway are provided. This mechanism, in the present instance, includes two dogs 72, 73, arranged to travel in different horizontal levels in the trackway 30; the lower dog 73 entering the slot 380 in the adjacent wall of the trackway and the dog 72 entering an upper parallel slot 730 in said wall, (see Fig. 7.)

The dog 72 is pivoted to a collar 74 which is slidingly fitted to a rod 75 fixed in brackets 76 rising from the table; a spline or similar connection 77 between the collar and the rod being provided to prevent rotation and yet permit longitudinal movement of the collar. This collar is pivotally connected with a rock-lever 78 which, being fulcrumed on a bracket 79 on the bed plate, is connected by means of a rod 80 with a crank-disk 81 on the shaft 48, the throw of the crank being such that the dog 72 passes to a position at the receiving end of the trackway 30 to engage the book which has been advanced by the dog 38 and then in its stroke to the rear shifts the book to a position laterally adjacent its companion book where the latter is deposited by the wheel on the trackway 30'.

On the collar 74 is preferably secured a spring hook 82, the hooked end of which receives a stud 83 on the dog 72 and thereby limits the inward movement of the dog against the action of a suitably-disposed spring 84 on the collar, which spring, yielding, permits the outward movement of the dog as it impinges against and passes a book in its return stroke. (See Fig. 11.)

The dog 73 is pivoted on a suitably-disposed collar 85 on the rod 40 and is adapted to engage the book immediately after it has been advanced by the dog 72, and thus complete the feeding of the book to the supporting member at the assembling station. (See Figs. 2, 3, 4, 5 and 10.)

Since the pusher 69 and dog 73 are connected with the respective rods 40, and as such pusher and dog simultaneously act upon the respective books which have been endwise reversed relatively to each other as above explained, it follows that the books thus positioned are concurrently impelled to the supporting member at the assembling station. This member comprises an obliquely-disposed partition plate 86 on the bed of the trackways, and two spring plates 87 adjacent the respective sides of the plate (86), the whole affording yielding grippers to receive and support the pair of books delivered thereto. The plate 86 is inclined as indicated in order to conform to the formation of the books and the angle of the dividing walls of the endless carrier into which such books are to be assembled in successive order. The spring plates 87 are also set at an angle at their upper ends, where they engage the books, such spring plates extending through slots in the bar 34 and being secured at their lower ends to a bracket 89 on the underside of the bar. (See Fig. 9.)

The carrier herein shown as the structure to receive and support the successive pairs of books comprises an endless chain of pivotally connected links 88 each of which is provided with the series of outwardly extending walls or jaws 88ª between which the books are inserted and thereby held by lateral friction. Only the receiving end of this carrier is shown, the same being represented as passing about a supporting wheel 90 (Fig. 6) suitably mounted to rotate at one end of the table. The carrier is impelled to advance the book-holders thereof progressively to position for the reception of the underlying books, such books thus being assembled side by side, with their thick and thin ends in alternation.

The books $a$ are pushed up into the opposing holders of the carrier by means of a bifurcated plunger 91, the spaced members 91' of which extend up through suitable openings in the bar 34 and impinge against the lower edges of the books in the support 86, 87. (Figs. 3, 8 and 10.) The lower end of the plunger is secured to a block 92 which is fitted to slide vertically in a guide way in a bracket 93 on the bed 46. The block bears a stud or roller 94 which enters the groove of a cam 95 on a shaft 96 having its bearings in brackets 97 on the bed. On this shaft is a sprocket wheel 98 which is operatively connected by a chain 99 with a similar wheel 100 on the drive shaft 48. (Figs. 1 and 6.) Thus the cam is continuously driven in a manner to effect the periodical vertical reciprocation of the bifurcated plunger.

Preferably the carrier is continuously driven at a predetermined speed, and therefore provision is had whereby the support 86, 87 is reciprocated longitudinally of the carrier, that is, the support is moved to a limited extent in the direction of movement of the carrier during the operation of transferring the books to the latter, and then retracted to its original position. Hence the bar 34 is pivoted by the stud 35 and its rearward or free end is slidingly supported in a horizontal guide bracket 36, as previously mentioned. Such end is provided with a depending stud or roller 101 which registers with the peripheral groove of a barrel cam 102 borne by a shaft 103 having its bearings in brackets on the underside of the table. (Figs. 1, 3 and 6.) This shaft 103 is geared with and driven from the main shaft 48, as, for example, by means of a chain 104 connecting sprocket wheels 105, 106 on the respective shafts. (Figs. 1 and 6.) The contour of the groove of cam 102 is such that the end of the bar connected therewith is moved in a direction corresponding with the motion of the carrier during the time that the books are being pushed into the latter, and then retracted to its original position for the reception of a succeeding pair of books; the members 91' of the plunger being sufficiently elastic or yielding to partake of the oscillatory motion of the bar.

It is to be understood that the invention may be used for the feeding and assembling of non-tapering book-matches, card-matches, and other articles. Also that the invention is not limited to the details of construction herein shown and described, as the same may be variously modified without departure from the fair spirit of the invention.

I claim—

1. In a machine for assembling match books, and the like, the combination of a support for the articles, and mechanism for successively impelling said articles in a vertical position along said support, said mechanism including means whereby predetermined articles are endwise reversed during their travel.

2. In a machine for assembling match books, and the like, the combination of a support for the articles, and mechanism for impelling said articles in adjacent rows along said support, said mechanism including means for endwise reversing the articles of one of the rows during their travel.

3. In a machine for assembling match books, and the like, the combination of means whereby the articles are supported in flat position, means whereby said articles are deflected to a vertical position side by side, and mechanism whereby said articles are impelled side by side, said mechanism including means whereby the articles are endwise reversed relatively to each other during their travel.

4. In a machine for assembling match books, and the like, the combination of means whereby the articles are supported in flat position, means whereby said articles are deflected to a vertical position side by side, mechanism whereby said articles are impelled side by side, said mechanism including means whereby they are endwise reversed relatively to each other during their travel, and means to receive and support the said articles in successive order.

5. In a machine for assembling match books, and the like, the combination of a support for the articles, mechanism for impelling two rows of the articles in a vertical position along said support, said mechanism including rotary means to intercept and endwise reverse the articles of one row.

6. In a machine for assembling match books, and the like, the combination of means for supporting successive pairs of articles in flat position, means for deflecting said articles to a vertical position, side by side, on a lower level, and mechanism for impelling the successive pairs of vertically-disposed articles, said mechanism including means to intercept and endwise reverse the articles of a row.

7. In a machine for assembling match books, and the like, the combination of a support for the articles, means for successively feeding said articles in a vertical position along said support, means for endwise reversing predetermined articles during their travel, a guide member to receive said articles, and means for feeding the articles to said guide member.

8. In a machine for assembling match books, and the like, the combination of a support for the articles, means for successively feeding said articles in a vertical position along said support, means for endwise reversing predetermined articles during their travel, a guide member to receive said articles, means for feeding the articles to said guide member, means for sustaining an assemblage of the articles, and means whereby the articles are progressively transferred from the guide member to said sustaining means.

9. In a machine for assembling match books, and the like, the combination of a support for the articles, means for successively feeding said articles in a vertical position along said support, means for endwise reversing predetermined articles during their travel, a guide member to receive said articles, means for feeding the articles to said guide member, a carrier, and means for progressively transferring said articles from said guide member to the carrier.

10. In a machine for assembling match books, and the like, the combination of a support along which the articles are impelled in adjacent rows, feed devices for simultaneously impelling the laterally adjacent articles of the respective rows, a rotatable member to which the articles in one row are successively delivered and thereby endwise reversed with relation to the articles in the adjacent row, and feed-devices for impelling the adjacent oppositely-disposed articles of the respective rows.

11. In a machine for assembling matchbooks, and the like, the combination of means for supporting the articles in flat position, with their headed ends rearward means for deflecting them to a vertical position on a lower level, whereon each article is imposed on one of its long narrow edges and means for successively impelling the vertically-disposed articles.

12. In a machine for assembling matchbooks, and the like, means for supporting successive pairs of the articles in flat position, those of each pair being abreast with their headed ends rearward, means for deflecting said articles to a vertical position, side by side, on a lower level, whereon each article is imposed on its long narrow edge, and means for impelling the successive pairs of vertically-disposed articles.

13. In a machine for assembling matchbooks, and the like, means for supporting the articles in flat position, means for deflecting them to a vertical position on a lower level, and mechanism for impelling the vertically-disposed articles, said mechanism including means whereby predetermined articles are endwise reversed during their travel.

14. In a machine for assembling matchbooks, and the like, a supporting structure having relatively broad adjacent ways, relatively narrow adjacent ways, and guide-ways converging from the broad to the narrow ways, whereby flat lying articles are guided and deflected from the broad ways to vertical position, side by side, on the narrow ways, in combination with means for simultaneously feeding the laterally adjacent articles along said narrow ways.

15. In a machine for assembling matchbooks, and the like, a supporting structure having relatively-broad adjacent ways, relatively narrow adjacent ways, and guide-ways converging from the broad to the narrow ways, whereby successive pairs of flat-lying articles are guided and deflected from the broad ways to a vertical position on the narrow ways, with the articles of each pair side by side, in combination with mechanism for feeding the laterally-adjacent articles along said narrow ways, said mechanism including means for endwise reversing the successive articles in one of said narrow ways.

16. In a machine for assembling matchbooks, and the like, a supporting structure provided with a guide element tapering from a relatively broad horizontal portion to a relatively narrow vertical portion, whereby a flat-lying article introduced to the wide portion of said element is deflected thereby to vertical position.

17. In a machine for assembling matchbooks, and the like, a supporting structure provided with a guide element tapering from a relatively broad horizontal portion to a relatively narrow vertical portion, whereby flat-lying articles successively introduced to the side portion of said element are deflected thereby to a vertical position, and means for successively impelling the vertically-disposed articles.

18. In a machine for assembling matchbooks, and the like, a supporting structure having two portions on different levels, and an inclined guide-way between said portions, the walls of said guide-ways converging from the upper to the lower level, whereby flat lying articles are guided and deflected from the upper portion to vertical position on the lower portion.

19. In a machine for assembling matchbooks, and the like, a supporting structure having two adjacent ways on one level, two adjacent ways on a lower level, and two guide-ways converging from the upper to the lower ways, whereby two flat-lying articles are guided and deflected from the upper ways to vertical position, side by side, on the lower ways.

20. In a machine for assembling matchbooks, and the like, the combination of a support along which the articles are impelled in adjacent rows, means for simultaneously impelling the laterally-adjacent articles of the respective rows, a rotatable member into which the articles in one row are successively delivered and thereby endwise reversed with relation to the articles in the adjacent row, means for successively feeding the articles in the latter row concurrently with and to a position abreast of the companion articles reversed by the said member, and means for thereafter simultaneously impelling the laterally-adjacent oppositely-disposed articles.

21. In a machine for assembling matchbooks, and the like, the combination with a vibratory support for the articles, mechanism for impelling said articles along said support, including means for endwise reversing predetermined articles during their travel, a carrier, means for progressively introducing the articles to said carrier, and means for moving the delivery portion of said support in the direction of motion of the carrier and back again.

22. In a machine for assembling matchbooks, and the like, a supporting structure having two relatively broad adjacent ways on one level, two relatively narrow adjacent ways on a lower level, and two guide-ways converging from the upper to the lower ways, whereby successive pairs of flat-lying articles are guided and deflected from the upper ways to vertical position on the lower ways, with the articles of each pair side by side, in combination with means for simultaneously impelling the laterally-adjacent articles of the lower guide-ways, a rotatable member into which the articles in one of said lower guide ways are successively delivered and thereby endwise reversed with relation to the articles in the other lower guide way, means for successively feeding the articles in the latter guideway concurrently with and to a position abreast of the companion articles reversed by the said member, and means for thereafter simultaneously impelling the laterally-adjacent oppositely-disposed articles.

23. In a machine for assembling matchbooks, and the like, a supporting structure having two relatively broad adjacent ways on one level, two relatively narrow adjacent ways on a lower level, and two guide-ways converging from the upper to the lower ways, whereby successive pairs of flat-lying articles are guided and deflected from the upper ways to vertical position on the lower ways, with the articles of each pair side by side, in combination with means for simultaneously impelling the laterally-adjacent articles of the lower guide-ways, a rotatable member into which the articles in one of said lower guide ways are successively delivered and thereby endwise reversed with relation to the articles in the other lower guideway, means for successively feeding the articles in the latter guideway concurrently with and to a position abreast of the companion articles reversed by the said member, means for thereafter simultaneously impelling the laterally-adjacent oppositely-disposed articles, and a supporting element on said structure to receive the said oppositely-disposed articles.

24. In a machine for assembling matchbooks, and the like, a supporting structure having two relatively broad adjacent ways on one level, two relatively narrow adjacent ways on a lower level, and two guide-ways converging from the upper to the lower ways, whereby successive pairs of flat-lying articles are guided and deflected from the upper ways to vertical position on the lower ways, with the articles of each pair side by side, in combination with means for simultaneously impelling the laterally-adjacent articles of the lower guide-ways, a rotatable member into which the articles in one of said lower guide-ways are successively delivered and thereby endwise reversed with relation to the articles in the other lower guide-way, means for successively feeding the articles in the latter guideway concurrently with and to a position abreast of the companion articles reversed by the said member, means for thereafter simultaneously impelling the laterally-adjacent oppositely-disposed articles, a supporting element on said structure to receive the said oppositely-disposed articles, a carrier adjacent said supporting element, and means whereby the articles are progressively transferred from said element to the carrier.

Signed at Barberton, in the county of Summit and State of Ohio this 13th day of May, A. D. 1913.

JOSEPH C. DONNELLY.

Witnesses:
W. S. JOHNSTON,
SABINA PARKS.

Copies of this patent may be obtained for five cents each, by addressing the "Commissioner of Patents, Washington, D. C."